United States Patent

Smith, Jr.

[11] Patent Number: 5,949,857
[45] Date of Patent: Sep. 7, 1999

[54] TELEPHONE DTMF SIGNAL ACCESSIBLE DATA PROCESSOR WITH CALCULATOR PROGRAM

[75] Inventor: Newton James Smith, Jr., Austin, Tex.

[73] Assignee: International Business Machines Corporation, Armonk, N.Y.

[21] Appl. No.: 09/213,910

[22] Filed: Dec. 17, 1998

[51] Int. Cl.$^6$ .................................................. H04M 11/00
[52] U.S. Cl. ................................. 379/93.27; 379/93.18; 379/88.01
[58] Field of Search ............................. 379/93.18, 93.26, 379/93.27, 93.25, 93.37, 102.01, 102.02, 102.07, 110.01, 283, 386, 52, 67.1, 88.01, 88.18

[56] References Cited

U.S. PATENT DOCUMENTS

| | | |
|---|---|---|
| 4,087,635 | 5/1978 | Vásquez . |
| 4,749,353 | 6/1988 | Breedlove . |
| 5,042,063 | 8/1991 | Sakanishi et al. . |
| 5,204,894 | 4/1993 | Darden . |
| 5,872,837 | 2/1999 | Johnson ............................... 379/93.18 |

Primary Examiner—Wing F. Chan
Attorney, Agent, or Firm—Lane, Aitken & McCann; Jeffrey S. LaBaw

[57] ABSTRACT

In a data processor having an application program accessible from a DTMF telephone, a calculator program is also provided. When a user has accessed the application program by means of a DTMF telephone, the user can switch to the calculator program to carry out a calculator function by means of a hot key input, in which the user presses the star key twice. Once in the calculator program, the user can enter numbers by pressing the telephone numerical keys and enter key sequences to command mathematical operations to be performed. The user can hot key back to the application program to continue the application program at any time by again entering the hot key transfer sequence in which the user presses the star key twice.

22 Claims, 4 Drawing Sheets

TELEPHONE DTMF SIGNAL ACCESSIBLE DATA PROCESSOR WITH CALCULATOR PROGRAM

This invention relates to telephone access to application programs on computers and, more particularly, to a system facilitating arithmetical or mathematical calculations in application programs accessed by telephone.

BACKGROUND OF THE INVENTION

The use of telephones to access application programs on computers is becoming more and more popular. One particular application for which telephone access is in widespread use is in bank account management systems. In a bank account management system, an account holder can access his account by telephone by dialing in a password and learn the balance of his account and other information. In addition, the holder can transfer balances from one account to another, such as from a savings account to a checking account or vice versa. In bank accounts called bill payer accounts, the account holder can direct payments to be made to designated payees without writing out and mailing checks.

Frequently, a user involved in accessing an application program by telephone has occasion or need to make mathematical calculations in the middle of making use of the application program. For example, the holder of a bank account using a bank account management program may need to make a calculation to determine how much to transfer from one account to another or decide how much is to be paid to a payee in a bill payer account. In systems currently available, the user of the application program must make the calculation manually or with a separate calculator and then enter the calculation into the program by means of the telephone pushbuttons. This process is inconvenient and awkward, particularly if the user is standing up or is at a pay telephone where a work surface is not readily available.

SUMMARY OF THE INVENTION

The above disadvantages are overcome by providing the user of the application program with a mathematical calculation capability in the computer or data processor in which the application program is being run. Specifically, the user after accessing an application program in a computer by telephone can access a calculator program by means of a hot key input from the telephone pushbuttons. Once into the calculator program, the user will be prompted by voice messages from the calculator and also entries made by the user will be confirmed by the voice messages. Upon completing the calculation, the user then again enters the hot key code to transfer back to the application program and the results of the calculation can then be used in the application program. In this manner, the user can readily make mathematical calculations during use of the telephone accessed application program and use the results of the calculation in the telephone accessed application program.

BRIEF DESCRIPTION OF THE DRAWINGS

The foregoing and other objects, aspects and advantages will be better understood from the following detailed description of a preferred embodiment of the invention with reference to the drawings, wherein.

DESCRIPTION OF A PREFERRED EMBODIMENT

Figure 1:
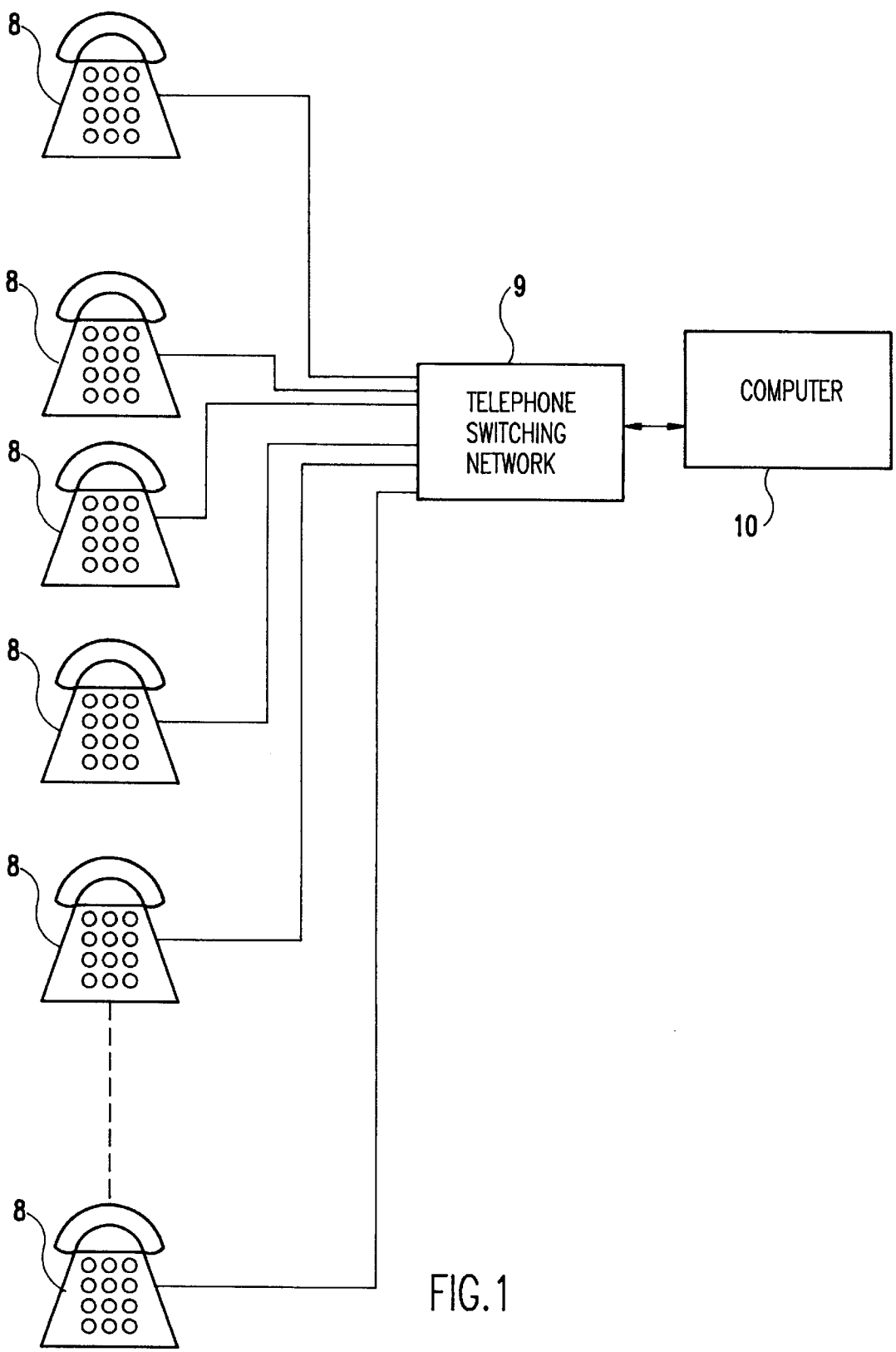
FIG. 1 is a block diagram illustrating the hardware of the system in which the present invention is employed.

In the system shown in FIG. 1, telephones 8 are connectable by a conventional telephone switching network 9 to a computer 10. Each telephone 8 has dial tone multifrequency (DTMF) capability wherein 12 conventional telephone dial keys are provided and each of which generates simultaneously two audio frequencies upon being actuated. The telephones 8 represent the universe of DTMF telephones connected to public telephone lines and networks. The telephone dial keys are keys representing and inscribed with the decimal digits 0 through 9, star (*) and pound (#). The keys for 2 through 9 are also inscribed with multiple letters inscriptions, ABC, DEF, GHI, JKL, MNO, PRS, TUV, and WXY, respectively.

The invention may be run on a variety of computers or collection of computers under a number of different operating systems. The computer could be, for example, a personal computer, a mini computer, mainframe computer or a computer running in a distributed network of other computers. Although the specific choice of computer is limited only by processing and disk storage requirements, computers in the IBM PS/2 (TM) series of computers could be used in the present invention. One operating system which an IBM PS/2 personal computer may run is IBM's OS/2 (TM).

In the alternative, the computer system might be in the IBM RISC System/6000 (TM) line of computers which run the AIX (TM) operating system. The various models of the RISC System/6000 are described in many publications of the IBM Corporation. The AIX operating system is described in other publications of the IBM Corporation.

Figure 2:
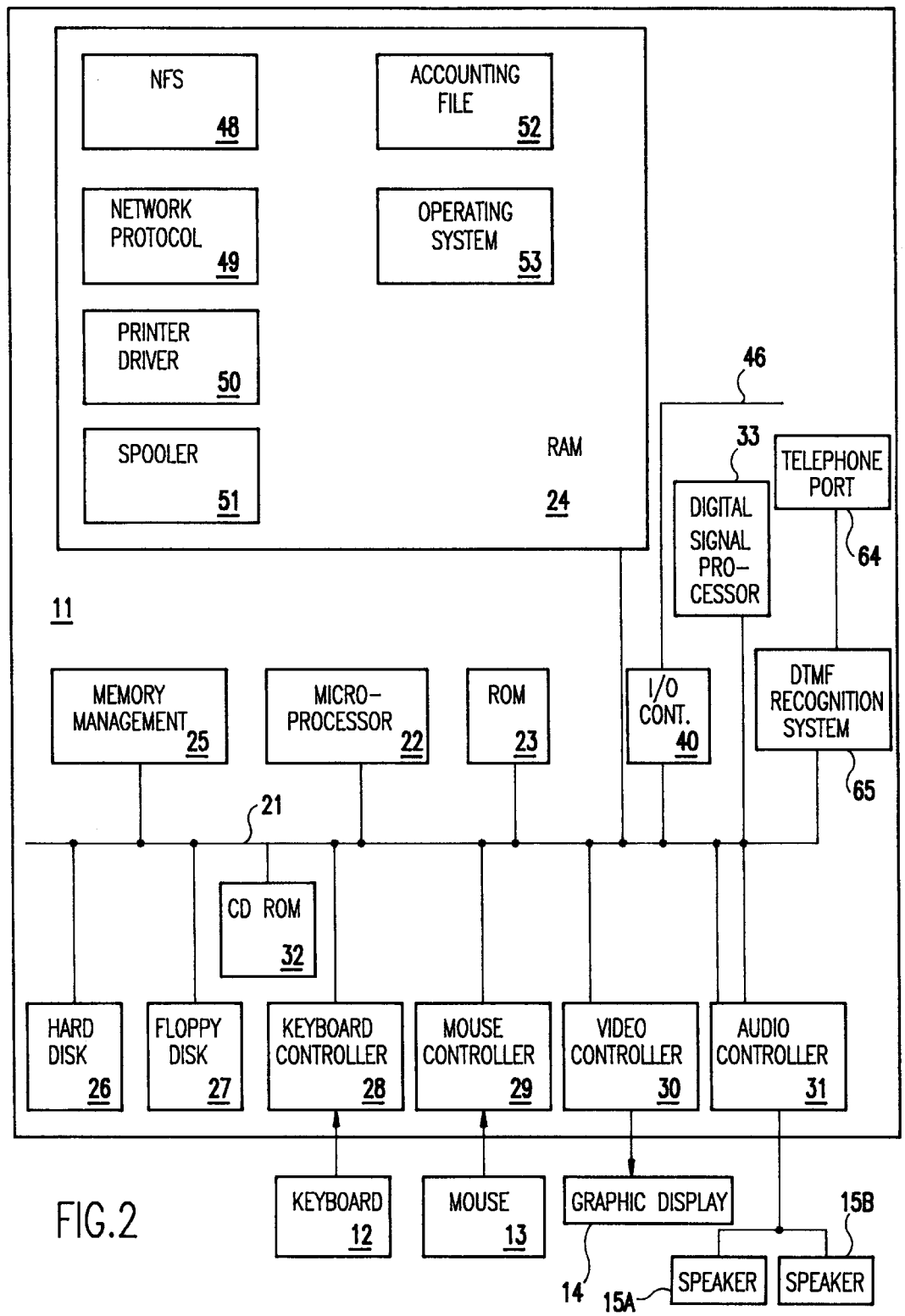
FIG. 2 is a block diagram of a computer employed in the system of FIG. 1.

While various computers can be used in the system of the invention, the computer 10 shown in FIG. 2 represents a typical computer, which can be used. The computer 10 comprises a system unit 11, a keyboard 12, a mouse 13 and a display 14, which are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM may be used. Other RISC chips made by Hewlett Packard, Sun, Motorola and others may be used in the specific computer.

The ROM 23 contains, among other codes, the Basic Input-Output System (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including passing data between the RAM 24 and hard disk drive 26 and floppy disk drive 27. The CD-ROM 32 also coupled to the system bus 21 is used to store a large amount of data, e.g., a multimedia program or presentation.

Also connected to this system bus 21 are various I/O controllers: the keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

Also connected to the signal bus 21 is a DTMF detection system 65 which is connected to a telephone line port 64.

As described above, one of the preferred implementations of the invention is as sets of instructions resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a transmission medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

To access an application program in the computer 10, the user dials the telephone number of the computer 10 from one of the telephones 8 and is connected to the computer 10 by means of the switching network 9. After making connection to the computer 10, the user then is prompted by verbal message to enter his password and, upon entering his password by means of the telephone pushbutton keys, the user enters the application program.

Figure 3:
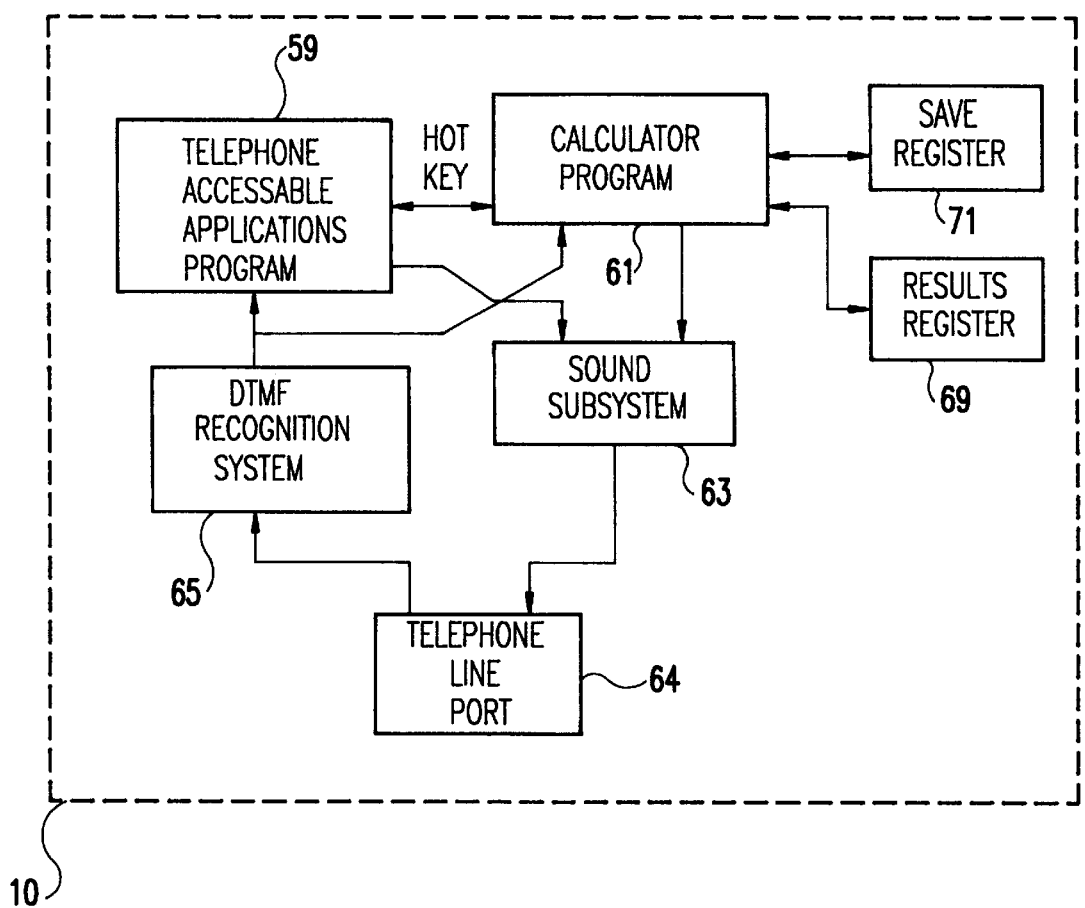
FIG. 3 is a block diagram illustrating the software of the system of the invention.

As shown in FIG. 3, the computer 10, in addition to being provided with a telephone accessible application program 59, is also provided with a calculator program 61, a sound system 63 and a DTMF recognition system 65. As indicated above, the application program may be a bank account management program or a bill payer program. Other examples of application programs with which the invention can be advantageously used are accounting programs, financial programs such as stock or investment portfolio programs, airline reservation programs, travel reservation programs, mortgage payment or management programs, or any financial management program. DTMF signals received through telephone port 64 are converted to digital data by the DTMF recognition system 65 and made available to the application program 59 and to the calculator program 61. The calculator program is provided with a results register 69, which stores the results of a mathematical calculation and a save register 71, which will store entered or calculated numbers as directed by the user. After entering the application program, the user is led by verbal message prompts to make use of the application program in a conventional manner. The verbal message prompts are synthesized by the sound system 63. At some point in the use of the application program, the user may wish to make a mathematical calculation. To make a mathematical calculation, the user enters a key sequence which is recognized as a hot key. In the preferred embodiment, this hot key sequence is two stars in sequence (*,*). This key sequence input is recognized by the computer operating program as a hot key and transfers access to the calculator program 61. Once in the calculator program, the user can enter numerical values by pressing the corresponding telephone keys 0–9 of a telephone 8. A multi digit number is entered by pressing the corresponding keys in sequence. The end of a multi-digit number is signaled by the user pressing the pound key (#). The star key (*) is used to initiate an escape sequence to signal arithmetic functions and other functions to be performed by the calculator. The sequence star A (*, 2) calls for an addition function. The sequence star S (*, 7) calls for a subtraction function. The sequence star M (*, 6) calls for a multiplication function. The sequence star D (*, 3) calls for a division function. The sequence star 0 (*, 0) represents the decimal point and the sequence star 1 (*, 1) triggers an audio help function, which generates a voice message explaining to the user how to use the calculator program. The sequence star K (*, 5) stores (keeps) the last entered number or the last calculated number in the save register. The sequence star G (*, 4) represents a get function and retrieves the number that is in the save register 71 as the next number to be used in the calculation being performed. Errors can be corrected in the calculation by entering the escape sequence star pound (*, #). This sequence discards the number which is currently being entered by the user and allows the user to start entering a new number. The sequence star pound star pound (*#*#) clears all of the calculator except for the save register to begin a new calculation. The pound key (#), in addition to signaling the end of a numerical value, is also used as an equal sign and asks for the results of the calculation to be reported to the user.

To carry out a calculation involving two numerical values, the user enters the digits of the first numerical value including any decimal point followed by the pound key. The user then keys in the sequence selecting the desired mathematical operation and then enters the digits of the second numerical value followed by the pound key. The user then presses the pound key again to obtain the results of the directed calculation, which have been stored in the results register 69.

As the user presses keys to enter numbers or make calculations, audio prompts will be provided back to the user by the calculator program 61 via the sound system 63. When the user enters the hot key sequence star star (*, *) to enter the calculator program, the user will receive the voice message prompt "begin calculation". When the user has entered a number and then pressed the pound key to indicate that the entry of the number is complete, the sound subsystem then repeats the number back to the user. When the user presses the sequence star A (*, 2), to call for addition, the voice message prompt returned to the user is the word "plus". When the user enters the sequence star S (*, 7) to call for subtraction, the voice message prompt returned to the user's telephone is the word "minus". When the entry sequence is star M (*, 6) to call for multiplication, the voice message returned to the user is "times". When the sequence star D (*, 3) is entered to call for division, the voice message returned to the user is "divided by".

When the user enters the error correction escape sequence star pound (*, #), a voice message will be returned to the user to indicate where in the calculation the error correction sequence was entered. Thus, if the error were in the entry of a second numerical value following the entry of a command to direct a calculation, the voice message prompt will correspond to the calculation. Thus, if the directed calculation was addition, the voice message prompt will be "plus". If the escape sequence star pound star pound is entered to clear the calculator, the voice message prompt will be "begin calculation".

An example of a user making use of the calculator program to add two numbers follows. First, the user, having accessed the telephone application program and desiring to make a calculation, makes the hot key entry sequence star star (*, *) to enter the calculator program, whereupon the user receives the voice message "begin calculation". The user then presses the keys 527*025# to enter the number 527.25. The audio prompt returns the voice message to the user "527 point 25". The user then presses the escape sequence *A to indicate an addition function and the audio prompt returns the voice message "plus" to the user. The user then presses the keys 82*028# and the audio prompt returns the voice message to the user "82 point 28". Assuming that the user intended to enter a different number, i.e., "82.38", the voice message prompt will cause the user to realize that he has made an error. Accordingly, the user will press the sequence star pound (*, #) to discard the previously entered number and the audio prompt function will again return the message word "plus" to the user which was the last function input entered before the discarded number. The user then enters the correct number, i.e., 82*038, and the audio prompt returns the voice message "8 2 point 3 8". When the user presses the pound key again to ask for the result of the calculation, the sound system returns the voice message "sum is 6 0 9 point 6 3". Pressing the pound key again will cause the sound system to repeat the result again. The user may then return to the application program by entering the hot key sequence star, star (*,*) The results of the calculation can then be used as directed by the user.

Additional functions can be provided, such as using the sequence star 8 (*, 8) to add an entered value or calculated result value to what is already stored in the save register and star 9 (*, 9) could be used for calculating a square root of a number. Three character escape sequences, such as star 3, 5 (* 3, 5), could be used to provide more complex mathematical calculations. Alternatively, one of the escape sequences could call for a report of the history of the calculation wherein the calculator program would cause the normal system to report the entire directed calculation to that point. For example, if the calculation directed were 527.25+82.38 as described above followed by a command to divide the results by 2 the history of the calculation message would be "527 point 25 plus 82 point 38 divided by 2 equals 304 point 815."

As long as the user is in a single telephone call connected to the computer 10, the calculator program remains active so that the user can hot key back and forth between the calculator program and the application program as many times as he wants. Each time the user hot keys back to the calculator, a voice message to the user will inform the user of the current status of the calculator. For example, the voice message "plus" would mean that the last entry of the user was star A (*, A) calling for addition with no final number added. If the calculation has been completed, then the result of the calculation would be indicated by the voice message. The contents of the save register will be preserved through multiple hot key accesses of the calculator program and returns to the application program. At the end of the telephone call, the calculator program shuts down and the contents of the save register are erased at that time.

In one embodiment of the invention, the user uses the results of the calculation in the application program by entering the calculated results by means of the telephone keys while in the application program. As a result, the calculator program of the invention can be readily implemented with an existing telephone application program with little or no change in the application program. If the user forgets the result of the calculation before he enters the result in the application program, he can hot key back to the calculator program, whereupon the user will hear a voice message of the previously calculated results, which will be stored in the results register 69, and then hot key back to the application program again.

In another embodiment, the results of the calculation can be entered in the application program from the results register at the option of the user. In this embodiment, the user, upon entering the hot key sequence to transfer to the application program from the calculator program, will receive a message asking the user if the results of the calculation are to be used in the application program and to "press one for yes, press 2 for no". If the user then presses the one key, the calculator results will be entered for use in the application program. If the user presses the 2 key, the results will not be entered in the application program. For example, if the user transferred to the calculation program after receiving a prompt to enter an amount in the application program, the user after calculating the amount to be entered in the calculation program, can enter the calculated amount in the application program in response to the prompt by transferring back to the application program and then pressing the one key to answer yes to the message question asking the user whether the calculation results are to be entered.

If the application program is a financial program, the user may be using the telephone access to the financial program to direct investments or to transfer funds from one investment fund to another. When user has been prompted to enter the amount to invest or transfer and needs to calculate the amount to be invested or transferred, the user makes use of the calculation program as described above to calculate the amount and then enters the calculated amount in the financial program as described above.

Figure 4:
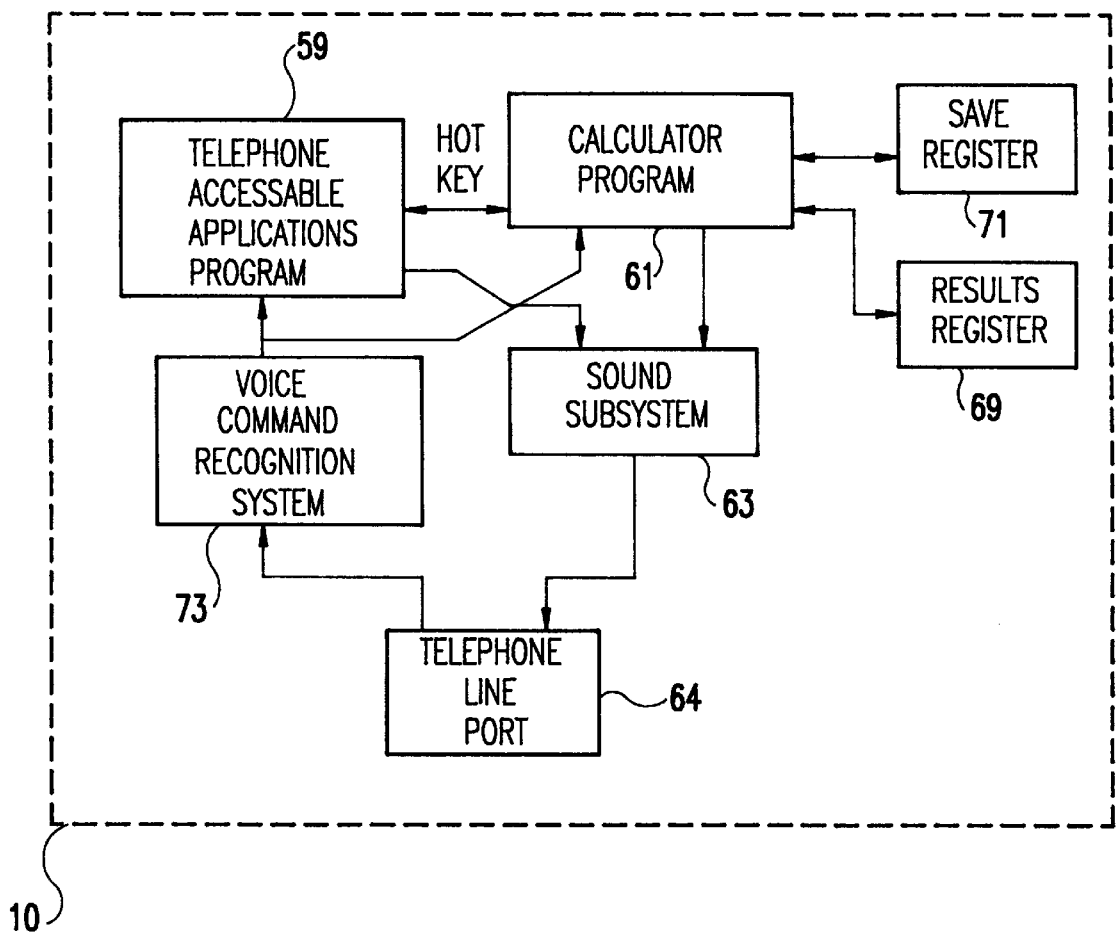
FIG. 4 is a block illustrating the software of the invention in an alternative embodiment of the invention.

Instead of using telephone key inputs from the telephones 8, the computer 10 could be provided with voice recognition so that the inputs to the calculator program 61 are by voice instead of by DTMF signals. Such a system is illustrated in FIG. 4, which is similar to FIG. 3 except that a voice command recognition system 73 is substituted for the DTMF recognition system. Also, the calculator can be provided in a way so that the user can access the calculator directly instead of via an application program as described above. The voice recognition input to the system could also be used in combination with a key input wherein responses to both voice commands and key inputs are recognized by the computer as inputs for the calculator program or for transfers between the application program and the calculator program.

These and other modifications may be made to the above-described specific embodiment of the invention without departing from the spirit and scope of the invention, which is defined in the appended claims.

What is claimed is:

1. A method of using a data processor having a telephone accessible application program, wherein said application program carries out functions in response to commands received from a telephone, comprising the steps of accessing said application program by telephone, sending a command from said telephone to said data processor to cause said data processor to switch from said application program into a calculator program which responds to commands received from a telephone to carry out mathematical operations, transmitting commands from said telephone to said data processor to cause said calculator program to carry out a mathematical calculation to determine a numerical result, then sending a command from said telephone to said data processor to switch said data processor from said calculator program to said application program, and using said numerical result in said application program.

2. A method as recited in claim 1, wherein said commands are transmitted to said data processor as DTMF signals.

3. A method as recited in claim 1, wherein said commands are voice signals received by said telephone and transmitted by said telephone to said data processor.

4. A method as recited in claim 2, wherein said command to switch said data processor from said application program to said calculator program is the same as the command to switch said data processor from said calculator program to said application program.

5. A method as recited in claim 2, wherein said command to switch said data processor between said application program and said calculator program is a sequence of DTMF signals, at least the first one of which is generated by a pushbutton on said telephone which is not a numerical button.

6. A method as recited in claim 1, further comprising sending voice message audio prompts to said telephone to be heard by said user at said telephone as the user at said telephone enters commands into said data processor to cause said calculator program to carry out a mathematical operation.

7. A method as recited in claim 1, further comprising sending a voice message to said telephone to be heard by a user at said telephone indicating the results of a mathematical operation carried out by said calculator program.

8. A method as recited in claim 1, further comprising sending numerical values from said telephone to said data processor, sending voice messages from said data processor to said telephone restating said numerical values upon their receipt by said data processor, using said numerical values in a mathematical calculation by said calculator program to determine said numerical result.

9. A method as recited in claim 8, wherein said program is a financial application program.

10. A method as recited in claim 1, wherein said calculated results are stored in a results register and are entered into said application program to be used in said application program from said results register.

11. A method as recited in claim 10, wherein the calculated results are entered into said application program from said results register in response to a command from said telephone.

12. A data processor accessible by telephone and having a first mode of operation where said data processor responds to input commands received from a telephone to carry out an application program and a second mode of operation wherein said data processor responds to commands received from a telephone to perform a mathematical calculation, means included in said data processor to respond to a predetermined command received from a telephone to switch said data processor from said first mode of operation to said second mode of operation and to respond to a predetermined command received from said telephone to switch said data processor from said second mode of operation to said first mode of operation.

13. A data processor as recited in claim 12, wherein said commands are in the form of DTMF signals.

14. A data processor as recited in claim 12, wherein said commands are voice commands received from said telephone.

15. A data processor as recited in claim 12, further comprising means to generate and transmit audio messages to said telephone to be heard by a user at said telephone as said data processor carries out a mathematical calculation in response to commands received from said telephone.

16. A data processor as recited in claim 12, wherein said voice messages confirm receipt of numerical values received from said telephone.

17. A data processor as recited in claim 12, wherein the command which causes said data processor to switch from said first mode to said second mode is the same as the command which causes said data processor to switch from said second mode to said first mode.

18. A computer program product in a computer readable medium for facilitating mathematical calculations in an application program accessed by telephone comprising:

means to carry out an application program in response to commands received from a telephone in a first mode;

means to carry out mathematical calculations in response to commands received from a telephone when operating in a second mode;

means responsive to a command received from said telephone to switch from said first mode to said second mode;

means responsive to a command received from said telephone to switch from said second mode to said first mode.

19. A computer program product as recited in claim 18, wherein the said command to switch from said first mode to said second mode is the same as the command to switch from said second mode to said first mode.

20. A computer program product as recited in claim 18, wherein said command to switch from said first mode to said second mode and to switch from said second mode to said first mode is a sequence of signals received from said telephone.

21. A computer program product as recited in claim 18, further comprising means to transmit audio messages to said telephone to be heard by a user at said telephone as mathematical calculations are carried out in response to commands received from said telephone.

22. A computer program product as recited in claim 21, wherein said voice messages confirm receipt of numerical values received from said telephone.

\* \* \* \* \*